United States Patent
Perlmutter et al.

(10) Patent No.: US 7,272,268 B2
(45) Date of Patent: Sep. 18, 2007

(54) REGISTRATION OF SEPARATIONS

(75) Inventors: Keren O. Perlmutter, Pacific Palisades, CA (US); Sharon M. Perlmutter, Pacific Palisades, CA (US); Eric Wang, Tustin, CA (US); Paul R. Klamer, La Canada, CA (US); Christopher J. Cookson, Studio City, CA (US); Massimiliano Gasparri, Los Angeles, CA (US)

(73) Assignees: AOL LLC, Dulles, VA (US); Warner Bros. Entertainment, Inc., Burbank, CA (US)

( * ) Notice: Subject to any disclaimer, the term of this patent is extended or adjusted under 35 U.S.C. 154(b) by 0 days.

(21) Appl. No.: 11/282,675

(22) Filed: Nov. 21, 2005

(65) Prior Publication Data

US 2006/0072850 A1  Apr. 6, 2006

(51) Int. Cl.
 *G06K 9/32* (2006.01)
(52) U.S. Cl. .................. 382/294; 382/260; 382/274; 382/275; 358/3.26; 358/3.27; 358/463
(58) Field of Classification Search ............. 382/274, 382/275, 282, 284, 294, 260; 358/538, 540, 358/450, 453, 3.26, 3.27, 520, 463
See application file for complete search history.

(56) References Cited

U.S. PATENT DOCUMENTS

| | | | |
|---|---|---|---|
| 4,285,004 A | 8/1981 | Morrison et al. | |
| 4,320,414 A | 3/1982 | Miyaji et al. | |
| 4,641,244 A | 2/1987 | Wilson et al. | |
| 4,849,914 A | 7/1989 | Medioni et al. | |
| 4,890,160 A | 12/1989 | Thomas | |
| 5,022,089 A | 6/1991 | Wilson | |
| 5,023,815 A | 6/1991 | Wilson et al. | |
| 5,129,009 A * | 7/1992 | Lebeau | 382/149 |
| 5,161,035 A * | 11/1992 | Muramatsu | 358/451 |

(Continued)

OTHER PUBLICATIONS

Ball, J.A. "The Technicolor Process of Three-Color Cinematography," *Journal of Motion Picture Engineers*, [online]. vol. XXV, No. 2, Aug. 1935, pp. 127-138. [retrieved on Dec. 18, 2002]. Retrieved from the Internet: URL:http://www.widescreenmuseum.com/oldcolor/ball.htm> 9 pages.

(Continued)

*Primary Examiner*—Yosef Kassa
(74) *Attorney, Agent, or Firm*—Fish & Richardson P.C.

(57) ABSTRACT

Separations or images relating to film or other fields may be registered using a variety of features, such as, for example: (1) correcting one or more film distortions; (2) automatically determining a transformation to reduce a film distortion; (3) applying multiple criteria of merit to a set of features to determine a set of features to use in determining a transformation; (4) determining transformations for areas in an image or a separation in a radial order; (5) comparing areas in images or separations by weighting feature pixels differently than non-feature pixels; (6) determining distortion values for transformations by applying a partial distortion measure and/or using a spiral search configuration; (7) determining transformations by using different sets of features to determine corresponding transformation parameters in an iterative manner; and (8) applying a feathering technique to neighboring areas within an image or separation.

12 Claims, 6 Drawing Sheets
(2 of 6 Drawing Sheet(s) Filed in Color)

U.S. PATENT DOCUMENTS

| | | | |
|---|---|---|---|
| 5,233,670 A * | 8/1993 | Dufour et al. | 382/197 |
| 5,315,413 A | 5/1994 | Yamamoto et al. | |
| 5,325,190 A | 6/1994 | Nagasaki et al. | |
| 5,418,574 A | 5/1995 | Miyabata et al. | |
| 5,475,428 A | 12/1995 | Hintz et al. | |
| 5,517,234 A | 5/1996 | Gerber et al. | |
| 5,548,326 A | 8/1996 | Michael | |
| 5,640,200 A | 6/1997 | Michael | |
| 5,641,596 A | 6/1997 | Gray et al. | |
| 5,682,440 A * | 10/1997 | Yukawa | 382/205 |
| 5,892,554 A * | 4/1999 | DiCicco et al. | 348/584 |
| 5,917,987 A | 6/1999 | Neyman | |
| 6,002,434 A | 12/1999 | Topper | |
| 6,075,905 A | 6/2000 | Herman et al. | |
| 6,097,833 A * | 8/2000 | Lobregt et al. | 382/130 |
| 6,115,071 A * | 9/2000 | Hurst et al. | 375/240.12 |
| 6,195,132 B1 * | 2/2001 | Kimura et al. | 348/618 |
| 6,266,452 B1 | 7/2001 | McGuire | |
| 6,282,326 B1 | 8/2001 | Lee et al. | |
| 6,295,083 B1 | 9/2001 | Kuhn | |
| 6,317,223 B1 | 11/2001 | Rudak et al. | |
| 6,323,934 B1 | 11/2001 | Enomoto | |
| 6,373,970 B1 | 4/2002 | Dong et al. | |
| 6,393,150 B1 | 5/2002 | Lee et al. | |
| 6,587,509 B1 * | 7/2003 | Suzuki et al. | 375/240.29 |
| 6,765,609 B1 * | 7/2004 | Kinoshita | 348/222.1 |
| 6,816,604 B2 | 11/2004 | Young, Jr. et al. | |
| 6,870,564 B1 | 3/2005 | Burns | |
| 2001/0030697 A1 | 10/2001 | Dischert et al. | |

OTHER PUBLICATIONS

Boult, T.E., and Wolberg, G., "Correcting Chromatic Aberrations Using Image Warping," *Proceedings of DARPA92*, pp. 363-377, 1992.

Brown, Lisa G., "A Survey of Image Registration Techniques," *ACM Computing Surveys*, vol. 24, No. 4, pp. 325-376, 1992.

Canny, John, "A Computational Approach to Edge Detection," *IEEE Transactions on Pattern Analysis and Machine Intelligence*, vol. PAMI-8, No. 6, Nov. 1986, pp. 679-698.

Li, H., et al. "A Contour-Based Approach to Multisensor Image Registration," *IEEE Transactions on Image Processing*, vol. 4, No. 3, Mar. 1995, pp. 320-334.

Srinivasan, S., et al., "*mist*: Multispectral Image Similarity Transformation," *LNK Home Page*, pp. 1-20, printed Dec. 12, 2001.

"Technicolor," [online]. [retrieved on Dec. 18, 2002]. Retrieved from the Internet: <URL:http://www.everything2.com/index.pl?node=Technicolor> 3 pages.

"The Wide Screen Time Machine: Mechanix Illustrated Mar. 1939, How the Technicolor Camera Works," [online]. [retrieved on Dec. 18, 2002]. Retrieved from the Internet: <URL:http://www.widescreenmuseum.com/widescreen/mi-techcamera.htm> 3 pages.

* cited by examiner

| 210 | 220 | 230 | 240 | 250 |

200

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

REGISTRATION OF SEPARATIONS

TECHNICAL FIELD

This invention relates to image processing, and more particularly to the registration of separations.

BACKGROUND

Color motion picture film is a relatively recent development. Before the advent of color film stock in the 1950s, a process for making color motion pictures included capturing color information on two or more reels of black and white film. In the original Technicolor three color film separation process, three reels of black and white film were loaded into a specially-designed movie camera. The light coming through the lens was split into the three primary colors of light and each was recorded on a separate reel of black and white film. After developing the three reels, three photographic negatives representing the yellow (inverted blue), the cyan (inverted red), and the magenta (inverted green) portion of the original reels were created.

In addition to the creation of color separations through the original Technicolor process, color separations also have been produced and used for the archival of color film because black and white film stock generally has a much greater shelf-life than color film. In this process, the color film stock is used to expose one reel of black and white film with sequential records of red, green, and blue so that each frame is printed three times on the resultant reel to form a sequential separation.

Film studios may recombine the three color separations onto a single reel of color film using a photographic process that is performed in a film laboratory. In the case of three color separations that are each located on a separate reel, an optical film printer is employed to resize and reposition each source reel, one at a time. In particular, three passes are made. First, the magenta source reel is projected through an appropriate color filter onto the destination reel. Thereafter, the destination reel is rewound, the next source reel is loaded and resized, and the color filter is changed. For this reel, a human operator determines a global alignment (and scaling if necessary) for the entire set of frames within the reel or, alternatively, within selected scenes on a scene-by-scene basis, with each scene including several, if not hundreds, of frames. However, because of the human intervention required, the alignment often is not determined on a frame-by-frame basis for the entire reel. The process is repeated until all three color separations have been printed on the single destination reel using the optical film printer. The resulting destination reel is called an interpositive ("IP"), and the colors are now represented as red, green, and blue (as opposed to cyan, magenta, and yellow).

SUMMARY

In one general aspect, automatic registration of film separations includes accessing component images that are based on digitized film separations. Each of the component images includes a set of gray-level pixels. An alignment vector is automatically determined for at least a part of a selected component image from among the accessed component images. One or more film distortions are corrected by applying the alignment vector to the part of the selected component image.

Component images may be based on digitized color film separations. Accessing component images may include digitizing film separations.

The alignment vector may align a part of a component image with a corresponding part of another component image, and the two component images may be combined after applying the alignment vector. One component image (e.g., a green component image) may be selected as a reference, and an alignment vector may be determined between a part of the reference and a part of another component image. An additional alignment vector may be determined between a part of a reference and a part of an additional component image.

An alignment vector may be determined by determining a first set of features associated with a part of a reference and determining a second set of features associated with a part of a selected component image. The first and second sets of features may be compared based on results obtained when applying one or more candidate alignment vectors. The alignment vector may be determined based on results of the one or more comparisons.

A first set of features may be determined by applying an edge detection filter to a part of a reference to generate a first preliminary set of edges. An edge refinement procedure may be applied to the first preliminary set of edges to obtain the first set of features. The second set of features may be determined by applying the edge detection filter to a part of a selected component image to generate a second preliminary set of edges. The edge refinement procedure may be applied to the second preliminary set of edges to obtain the second set of features. The edge refinement procedure may include selecting edges based on a characteristic (e.g., high intensity) of a component image.

The edge refinement procedure may include identifying a connected edge within an area under consideration. The connected edge may be included in a set of selected edges if the connected edge meets a first criterion of merit. The first criterion of merit may require at least a predetermined amount of information in one direction. A set of features may be obtained based on whether the entire set of selected edges satisfies a second criterion of merit. The second criterion of merit may require the entire set of selected edges to have at least a predetermined amount of information.

Comparing a first and a second set of features may include assigning a non-zero amount of distortion to a pixel in a first component image only if the pixel is part of a feature and if a pixel at a corresponding location in a second component image is not part of a feature. The distortion values obtained for a predefined set of pixels in an area being examined in the first component image may be summed. The first component image may be any component image.

Comparing a first and second set of features based on results obtained when applying a candidate alignment vector may include selecting an initial candidate alignment vector. The initial candidate alignment vector may be varied so as to represent multiple relative displacement possibilities within a particular proximity window of the initial candidate alignment vector. Selecting the initial candidate alignment vector may include determining a first set of features associated with a center part of a reference, and determining a second set of features associated with a center part of a selected component image. The first and second sets of features associated with the center parts of the reference and the selected component image may be compared, and the initial candidate alignment vector may be selected based on results of the comparison.

Determining an alignment vector may include dividing a selected component image into a set of areas. An initial alignment vector for a particular area may be determined based on at least one previously determined alignment vector for another area. The alignment vector for the particular area may be determined based on the initial alignment vector for the particular area, which may be determined based on at least one previously determined alignment vector for a neighboring area, which may be defined as an area that shares a common border or at least one pixel with the particular area. The initial alignment vector may be chosen as the previously determined alignment vector that provides a minimum distortion value for the particular area among the previously determined alignment vectors for at least two of the neighboring areas.

Alignment vectors may be applied to multiple areas of a component image, and a technique may be applied to smooth discontinuities that may result when different areas possess different alignment vectors. Applying a technique to smooth discontinuities may include defining a window of nonzero horizontal or vertical extent along a boundary of contiguous blocks. Alignment vectors obtained from each of the contiguous blocks may be interpolated in order to obtain a new set of alignment vectors for parts of the contiguous blocks within the window. The new set of alignment vectors may be applied to the parts of the contiguous blocks within the window.

Determining an alignment vector may include dividing the selected component image into a set of areas arranged such that a center of at least one area of the set of areas and a center of at least one other area of the set of areas are in different proximity to a center of the selected component image. The areas are grouped into multiple rings. An initial alignment vector for a particular area is determined based on at least one previously determined alignment vector for at least one neighboring area, where the neighboring area belongs to either an inner ring or to the same ring as the particular area. The alignment vector for the particular area is determined based on the initial alignment vector for the particular area. The initial alignment vector may be determined based on a previously determined alignment vector that provides a minimum distortion value for the particular area among previously determined alignment vectors for at least two neighboring areas. The initial alignment vector may be determined based on a previously determined alignment vector for an inward radial neighbor area.

In another general aspect, performing registration of digitized images includes selecting at least two areas from each of a first image and a second image. Separate transformations are determined for the selected areas of the first image based on a comparison of areas within the first and second images. A feathering technique is applied within a predetermined amount of at least two neighboring areas within the selected areas in order to obtain new transformations for the predetermined areas if the transformations for the neighboring areas differ, where the new transformations are based on the separate transformations.

The transformations may be applied to the selected areas of the first image. The transformations may be represented as alignment vectors, and applying the feathering technique may include linearly interpolating between alignment vectors. The images may correspond to color film separations.

In another general aspect, performing registration of digitized images includes dividing a selected component image into a set of areas and grouping the areas into multiple rings. Transformations for at least two areas are determined in an order that begins with at least one area within an innermost ring and proceeds to at least one area within a ring other than the innermost ring.

The set of areas may be arranged such that a center of at least one area of the set of areas and a center of at least one other area of the set of areas are in different proximity to a center of the selected component image. Determining the transformations may include determining an initial alignment vector for a particular area of the set of areas based on a previously determined alignment vector corresponding to at least one neighboring area, where the neighboring area belongs to either an inner ring or to a same ring as the particular area. An alignment vector may be determined for the particular area based on the initial alignment vector for the particular area. The initial alignment vector may be based on a previously determined alignment vector that provides a minimum distortion measure for the particular area among previously determined alignment vectors for at least two neighboring areas. The initial alignment vector may be based on a previously determined alignment vector for an inward radial neighboring area.

In another general aspect, performing registration of digitized images includes selecting a first area in each of a first image and a second image. Feature pixels are determined in the first areas of the first and second images. The first areas are compared by weighting a comparison of feature pixels in the first area of the first image with corresponding pixels in the first area of the second image differently than a comparison of non-feature pixels in the first area of the first image with corresponding pixels in the first area of the second image. A transformation is determined for the first area of the first image based on the comparison of the first areas.

The first and second images may be based on digitized color film separations. Weighting may include accumulating a non-zero distortion only if a pixel in the first area of the first image has been classified as a feature and a corresponding pixel in the first area of the second image has not been classified as a feature. The features may be edges. Weighting may include associating a weight of zero to the comparison of non-feature pixels in the first area of the first image with corresponding pixels in the first area of the second image, such that the comparison involving non-feature pixels in the first area of the first image need not be performed.

In another general aspect, performing registration of digitized images includes selecting a first area in each of a first image and a second image. Feature pixels are determined in the first areas of the first and second images. A transformation is determined for the first area of the first image. Determining the transformation includes computing distortion values using a partial distortion measure on candidate alignment vectors that are processed in a spiral search configuration, and selecting one of the candidate alignment vectors as the transformation based on the computed distortion values.

The spiral search may include determining distortion values associated with different horizontal and vertical relative displacements of an initial alignment vector in an order characterized by increasing radial distance along a spiral scanning path. Determining distortion values associated with different horizontal and vertical relative displacements may include beginning at a location associated with the initial alignment vector and proceeding along the spiral scanning path within a preset window size.

Computing distortion values using the partial distortion measure may include defining a set of pixels within an area. A partial sum of distortion values may be calculated, the partial sum being associated with a candidate alignment vector using a subset of the set of pixels. The partial sum may be compared to a current minimum distortion. The candidate alignment vector may be excluded as a potential choice for the transformation if the partial sum is greater than or equal to the current minimum distortion. An additional partial sum may be added to the partial sum if the partial sum is less than the current minimum distortion, the additional partial sum being obtained using an additional subset of the set of pixels. Further additional partial sums may be added, and further comparisons to the current minimum distortion may be performed, until either the partial sum is greater than or equal to the current minimum distortion or all pixels in the set have been used.

In another general aspect, performing registration of digitized images includes selecting a first image and a second image. A first set of features and a second set of features are defined. A first alignment vector is determined for a part of the first image based on the first set of features. A second alignment vector is determined for the part of the first image based on the second set of features. Determining the second alignment vector includes using the first alignment vector as an initial second alignment vector, and choosing the second alignment vector from a set of candidate alignment vectors obtained by varying the initial second alignment vector. The first alignment vector is modified. Modifying the first alignment includes using the second alignment vector as an initial first alignment vector, and choosing the first alignment vector from a set of candidate alignment vectors obtained by varying the initial first alignment vector. Determining the second alignment vector and modifying the first alignment vector are repeated until a particular stopping condition is met.

The first set of features may correspond to edges in one direction and the second set of features may correspond to edges in an orthogonal direction. The set of candidate alignment vectors for each directional set of edges may include alignment values that differ in only one direction. The set of candidate alignment vectors may decrease in size each time the first and second alignment vectors are determined. The stopping condition may be a preset number of iterations. The stopping condition may be met when the first and second alignment vectors determined after a particular iteration are equivalent to the first and second alignment vectors after a previous iteration.

In another general aspect, performing registration of digitized images includes selecting a first area from each of a first image and a second image. A first set of features is detected in the first area of the first image. A second set of features is determined consisting of the features from within the first set that include a first predetermined amount of information. It is determined whether the second set of features is collectively sufficient to provide a meaningful comparison. If the second set of features is deemed collectively sufficient, a transformation is determined for the first area of the first image based on a comparison of the first area of the first image with areas of the second image.

The second set of features may be sufficient if the second set collectively includes a second predetermined amount of information. The first set of features may include a set of features that are oriented in a particular direction. The first set of features may include edges in the first area of the first image. The images may be based on digitized spectral separations. The spectral separations may include color film separations.

The first areas of the first and second images may include pixels. Determining a transformation may include determining which pixels in the first areas of the first and second images are feature pixels and weighting them differently. Weighting may include weighting a comparison of feature pixels in the first area of the first image with corresponding pixels in the first area of the second image differently than a comparison of non-feature pixels in the first area of the first image with corresponding pixels in the first area of the second image.

In another general aspect, performing registration of digitized images includes selecting automatically a first area in each of a first image and a second image. A transformation is determined automatically for the first area in the first image based on a comparison of the first area of the first image with corresponding areas of the second image. The transformation is applied automatically to the first area in the first image, and a film distortion is reduced.

The first and second images may be based on film separations, and the film separations may include color separations. A transformation may be similarly determined and applied to a second area in the first image that is not isolated from the first area. The two transformations may be represented as alignment vectors that differ and a feathering may be applied. A feathering technique may be applied to the first and second areas within a predetermined amount of the first and second areas in order to obtain new alignment vectors within the predetermined amounts, where the new alignment vectors are based on the first and second alignment vectors. Transformations may be similarly determined and applied to multiple areas in the first image, and the transformations for the multiple areas may be determined in an order of increasing radial distance. Determining the transformation may include selecting automatically a feature in the first areas of the first and second images and using a feature-based measure to compare the first areas of the first and second images.

Determining the transformation may include detecting automatically a feature in the first area of the first image. Parts of the feature may be eliminated automatically if they do not contain a predetermined amount of information. It may be determined whether parts of the feature that were not eliminated provide a basis for meaningful comparison. Determining whether the parts not eliminated provide a basis for meaningful comparison may include determining whether the parts not eliminated collectively contain a second predetermined amount of information. The feature may include edges in the first area.

Other features and advantages will be apparent from the following description, including the drawings, and the claims.

Various general aspects address methods for the registration of separations or images that may correspond to separations. The separation may relate to film or other fields. Such methods may include one or more of a variety of features, such as, for example: (1) accessing component images that are based on a variety of separations, including, for example, digitized film separations for which each of the component images includes a set of gray-level pixels; (2) correcting one or more film distortions; (3) automatically determining a transformation to reduce a film distortion; (4) applying multiple criteria of merit to a set of features to determine a set of features to use in determining a transformation; (5) determining transformations for areas in an image or a separation in a radial order; (6) comparing areas in images or separations by weighting feature pixels differently than non-feature pixels; (7) determining distortion values for transformations by applying a partial distortion measure and/or using a spiral search configuration; (8) determining transformations by using different sets of features to determine corresponding transformation parameters in an iterative manner; and (9) applying a feathering technique to neighboring areas within an image or separation.

The described implementations may achieve, one or more of the following features. For example, they may provide an automatic and efficient digital image registration process for color film separations. The process may operate in the digital domain to enable the use of a number of digital image processing techniques, and may require minimal human intervention. The process may be computationally efficient, and may be capable of determining alignments on a frame-by-frame basis. The process also may address the local nature of the misregistration within an image that results from such causes as film shrinkage due to aging. In addition, the process may compensate, correct, or avoid one or more of the described distortions.

One or more implementations are set forth in the accompanying drawings and the description below. Other implementations will be apparent from the description, drawings, and claims.

DESCRIPTION OF DRAWINGS

The patent or application file contains at least one drawing executed in color. Copies of this patent or application publication with color drawing(s) will be provided by the Office upon requet and payment of the necessary fee.

FIG. 3 is a diagram of a partitioning of an image into blocks.

DETAILED DESCRIPTION

Figure 1:
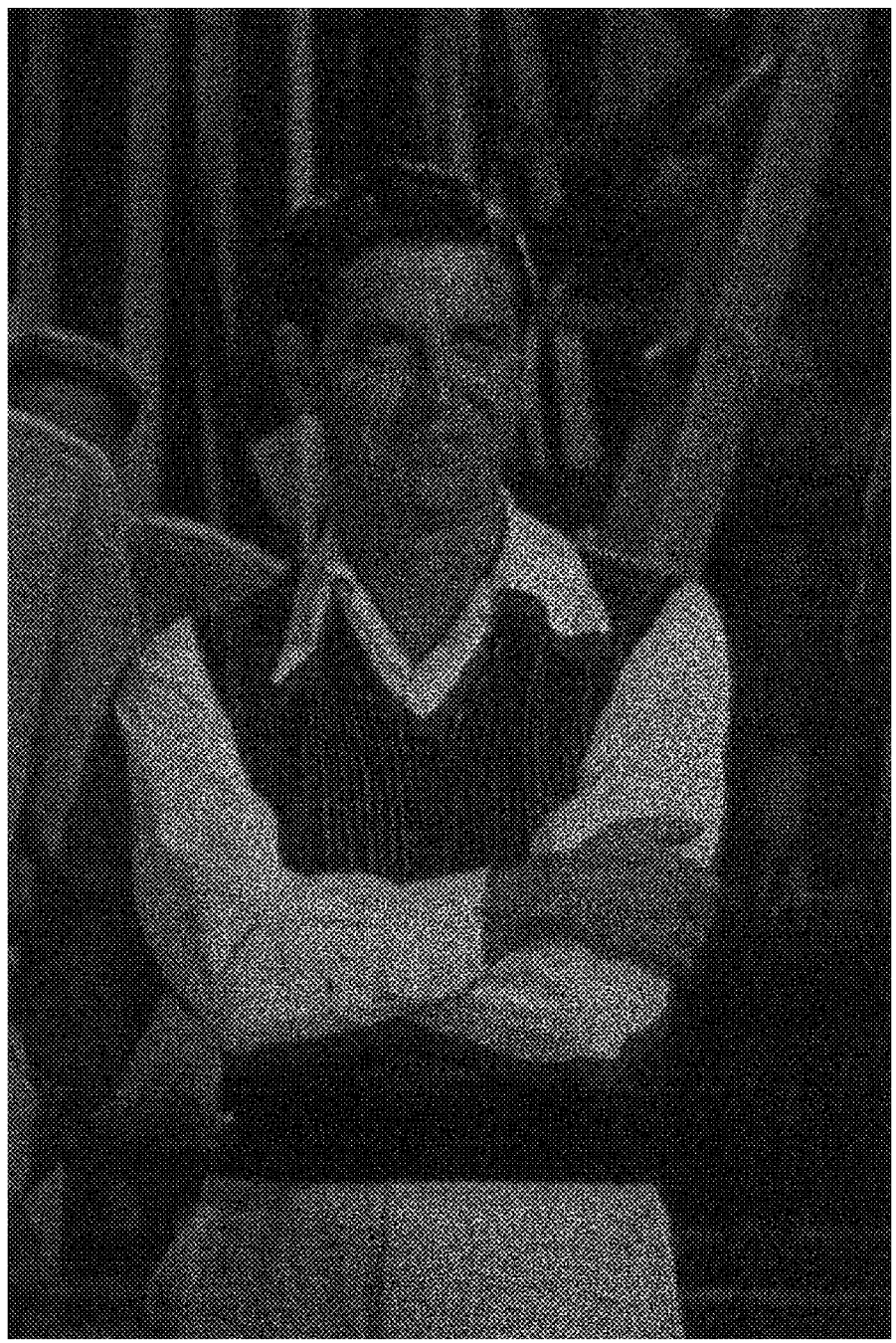
FIG. 1 is a picture illustrating misregistration.

The film processes described earlier, as well as other processes, may be subject to one or more of a variety of well-known film distortions. These include static misregistration, dynamic misregistration, differential resolution, and loss of resolution. Although referred to as film distortions, these distortions also may be present in other applications and environments. For example, registration of separations may be required, and one or more film distortions may be present, in photography, astronomy, and medical applications.

Static misregistration may be experienced due to one or more of a variety of reasons, six examples of which follow. First, in order to prevent color fringing around objects, the three source separations should be aligned with each another. The original cameras typically were adjusted mechanically by a technician with a micrometer. The alignment results therefore often varied, usually from camera to camera, within a single movie title. Second, due to variations among film printers, the printers sometimes failed to hold each of the separations to the same tolerances. Third, differences between the camera and the printer may have caused color shifting. Fourth, the photographic compositing process discussed above typically operates on either a reel-by-reel basis or a scene-by-scene basis, rendering it difficult to correct misalignments that may occur on a frame-by-frame basis. Fifth, because the photographic compositing process provides a global alignment for a particular image, the process does not necessarily address the local misalignments that may occur within an image. Sixth, because film tends to shrink as it ages and the rate of shrinkage may vary per separation, color can fringe around the edges of an image even if the center of the image is perfectly registered.

Dynamic misregistration also may be experienced due to one or more of a variety of reasons, three examples of which follow. First, the film separations in a camera are subject to intermittent motion, stopping and starting, for example, twenty four times every second. All three separations must stop in precise alignment in order to obtain proper registration. However, such precise timing is difficult to achieve and maintain. Second, from frame-to-frame, the film may move in the camera or subsequent film printer leading to color fringing that moves in like manner. Third, film may be spliced together as part of a normal editing process, resulting in splices that are physically thicker than the film. When the splices pass over a roller in the photographic printing process, a small vertical bump in one or more color film separations may occur. As discussed above, because the photographic compositing process may not operate on a frame-by-frame basis, the process may not capture these types of misalignments.

Differential resolution also may arise due to one or more of a variety of reasons. For instance, the nature of the light path and lens coatings in the Technicolor cameras typically caused the three film separations to have drastically different resolution or sharpness. In particular, the cyan separation typically was located behind the yellow separation in what was known as a bipack arrangement. Light that passed through the yellow separation was filtered and unfortunately diffused before striking the cyan separation. As a result, the yellow (inverted blue) separation typically had a greater resolution compared to the cyan (inverted red) separation, and the magenta (inverted green) separation typically had a resolution that was similar to that of the yellow (inverted blue) separation. This difference in resolution may result in red fringing that encircles many objects.

Loss of resolution may arise, for example, from the use of an optical printer. Such a loss of resolution will affect all three separations. Thus, the resulting printer output can never be as sharp as the source.

Digital image registration can be used to address one or more of these film distortions. One aspect of digital image registration includes the process of aligning two or more digital images by applying a particular mapping between the images. Each digital image consists of an array of pixels having a dimensionality that may be quantified by multiplying the image width by the image height. Within the array, each pixel location $(x, y)$, $0<=x<=\text{width}$, $0<=y<=\text{height}$, has an associated gray-level value $I(x, y)$, where $0<=I(x, y)<=65,535$ (in the case of 16-bit data). The gray-level value $I(x, y)$ represents how much of the particular color (for example, red, green, or blue) is present at the corresponding pixel location $(x, y)$. If I1 represents a first image, I2 represents a second image, $I1(x, y)$ represents a pixel value at location $(x, y)$ within image I1, and $I2(x, y)$ represent a pixel value at location $(x, y)$ within image I2, the mapping between the two images can be expressed as:

$$I2(x,y) \text{ corresponds to } I1(f(x,y)),$$

where f is a two dimensional spatial coordinate transformation that can be characterized by a pixel alignment vector. A registration algorithm may be used to find a spatial transformation or alignment vector to match the images.

Figure 2:
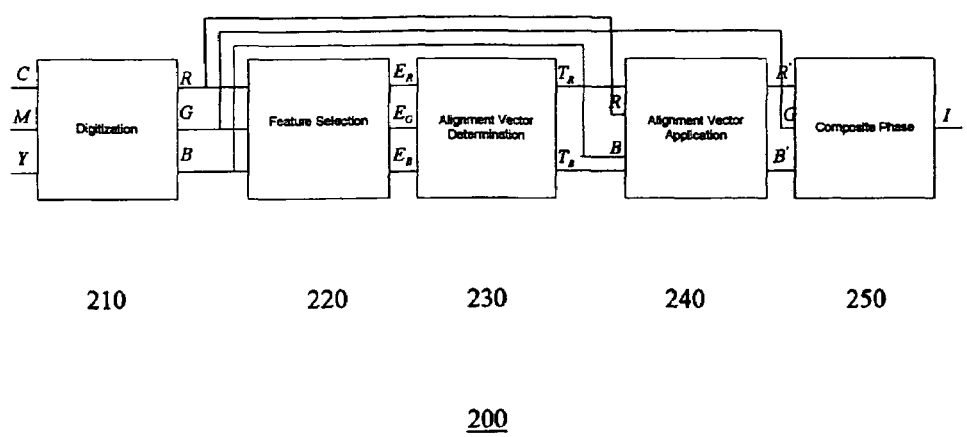
FIG. 2 is a block diagram of an implementation of a registration method.

FIG. 1 illustrates one visual manifestation of misregistration that can occur due to one or more sources of distortion. One implementation for performing the registration in a way that reduces the misregistration leading to such distortion is illustrated in FIG. 2, which illustrates a system 200 including a digitization unit 210 that receives three separation images and outputs three digital, and possibly transformed, color component images. A feature selection unit 220 receives these digital images and, after processing, outputs them to an alignment vector determination unit 230. The alignment vector determination unit 230 determines transformations for two of the images against the third, with the third being used as a reference. In other implementations that employ other than three images, the alignment vector determination unit 230 would produce transformations for N−1 images, where N is the total number of images.

An alignment vector application unit 240 receives the two transformations from the alignment vector determination unit 230 and the two non-reference digital images from the digitization unit 210. The alignment vector application unit 240 modifies these two non-reference images using the transformations. Finally, a composite phase unit 250 combines the two modified images and the reference image into a composite image.

Digitization Unit

Multiple color separations are input into the digitization unit 210. In one implementation, the digitization unit 210 accepts multiple photographic negative images (for example, yellow, cyan, and magenta) and outputs multiple photographic positive images (for example, blue, red, and green) as digital data in the form of a set of gray-level pixels. Other implementations may perform one or more of a variety of other transformations, such as, for example, positive-to-negative, in lieu of or in addition to the negative-to-positive transformation; perform no transformation at all; or accept digitized data and thereby obviate the need for digitization.

Feature Selection Unit

Each of the digital color component images is input into the feature selection unit 220. Generally, the feature selection unit 220 selects a feature or feature set, such as, for example, one or more edges, objects, landmarks, locations, pixel intensities, or contours. In one implementation of the system 200, the feature selection unit 220 identifies a set of edges, optionally or selectively refines this set, and outputs an edge map (labeled $E_R$, $E_G$, or $E_B$) that may be in the form of an image consisting of edge and non-edge type pixels for each color component image.

An edge detection filter, for example, a Canny filter, may be incorporated in or accessed by the feature selection unit 220 and may be applied to a digital color component image in order to obtain a set of edges. The edge information may be combined or separated into, for example, orthogonal sets. One implementation obtains separate horizontal and vertical edge information.

After the edge detection filter has been applied and edge maps for the separate color component images are created, the edge maps can be further refined to attempt to identify a set of useful edges. In particular, the set of edges may be pruned to a smaller set so as to reduce the inclusion of edge pixels having properties that could cause misleading misregistration results. In one implementation, the feature selection unit 220 performs this pruning by applying one or more criteria of merit to each edge in order to determine whether that particular edge should be included or rejected. Thereafter, one or more second criteria of merit may be applied to the collection of included edges in order to determine whether the entire set should be retained or if the entire set should be rejected. If there are no acceptable refined edges after using one or more refinement techniques either individually or in combination, the alignment vector can be determined in some other manner, such as, for example, by applying the techniques discussed below with respect to the alignment vector determination unit 230.

Several techniques may be used to refine a set of edges by enforcing a minimum edge requirement and/or emphasizing high intensity areas. Examples of these techniques include the use of horizontal/vertical information and the use of high intensity selection, both of which are discussed below.

a. Horizontal/Vertical Information

When searching for horizontal and vertical translational shifts, or more generally, alignments vectors, one implementation ensures that there is enough useful vertical and horizontal edge information within the area under consideration to make a useful alignment determination. For example, if there were only horizontal edges in an area (where the area could be of any size up to the full image size), it may not be beneficial to use these edges as features to determine a translational shift in the horizontal direction.

In order to determine the usefulness of certain edges, each edge is first compared to a criterion of merit that determines the vertical and horizontal extent of the edge in both absolute and relative (with respect to the other direction) terms. Thereafter, the set of edges that has been determined to have sufficient vertical or horizontal extent is compared to another criterion of merit in order to determine whether this new set should be retained or rejected in its entirety.

For instance, in one implementation, determining the sufficiency of vertical/horizontal edge information may include identifying a connected edge. For example, a connected edge may be identified by identifying a set of adjacent pixels that each have characteristics of an edge and that each have at least one neighbor pixel with characteristics of an edge.

For each connected edge in the area under consideration, a determination may be made as to whether there is sufficient vertical and horizontal information. This determination may be made using the parameters that "min_x" is the minimum value of x within the connected edge, "y_for_min_x" is the value of y corresponding to the minimum value of x, "max_x" is the maximum value of x within the connected edge, "y_for_max_x" is the value of y corresponding to the maximum value of x, "min_y" is the minimum value of y within the connected edge, "x_for_min_y" is the value of x corresponding to the minimum value of y, "max_y" is the maximum value of y within the connected edge, "x_for_max_y" is the value of x corresponding to the maximum value of y, "N_x" is max_x−min_x+1, "N_y" is max_y−min_y+1, "y_info" is the absolute value of (max_y−min/(x_for_max_y−x_min_y), "x_info" is the absolute value of (max_x−min_x)/(y_for_max_x−y_for_min_x), and T_x1, T_x2, T_y1, and T_y2 represent preset or configurable thresholds.

With these parameters, Total_x, a value for the total number of horizontal edge candidate pixels, may be computed by adding N_x to Total_x for each edge for which N_x is greater than T_x1 and x_info is greater than T_x2. That is, an edge is included as a horizontal edge candidate and the total number of horizontal edge candidate pixels is incremented by N_x if N_x and x_info are greater than the thresholds T_x1 and T_x2, respectively. Otherwise, none of the pixels for the connected edge are used to determine vertical shifts.

Similarly, Total_y, a value for the total number of vertical edge candidate pixels, may be computed by adding N_y to Total_y for each edge for which N_y is greater than T_y1 and y_info is greater than T_y2. That is, an edge is included as a vertical edge candidate and the total number of vertical edge candidate pixels is incremented by N_y if N_y and y_info are greater than the thresholds T_y1 and T_y2, respectively. Otherwise; none of the pixels for the connected edge are used to determine horizontal shifts.

Once all the edges of the area are processed, the total number of candidate edges for each direction, Total_x and Total_y, are compared to the preset threshold, T_total.

If Total_x is greater than T_total, all of the pixels associated with the identified horizontal edge candidates are considered horizontal edge pixels. Otherwise, if Total_x is less than or equal to T_total, the number of horizontal edge candidates is deemed insufficient, and, as such, none of the edges within the area are used for the vertical shift determination.

If Total_y is greater than T_total, all the pixels associated with the identified vertical edge candidates are considered vertical edge pixels. Otherwise, if Total_y is less than or equal to T_total, the number of vertical edge candidates is deemed insufficient, and, as such, none of the edges within the area are used for the horizontal shift determination.

Where no acceptable horizontal and/or vertical edges are identified within an area, an alternate method of obtaining the alignment values for that area in one or more directions may be used. Several alternative methods are discussed below with respect to the alignment vector determination unit 230.

b. High Intensity Selection

In general, a misregistration at bright areas of an image is more observable and objectionable than a misregistration at darker areas of an image. For example, the eye would more readily observe a red area extending beyond a white area than a red area extending beyond a brown area. As such, it may be desirable to target or exclusively select edges that exist within high intensity areas. Such targeting/selection may be achieved through the construction of an edge map using a process that compares the gray-level pixel intensities associated with each color component image to a threshold. Although described below as being applied to an initial and thus unrefined edge map, high intensity selection may be applied to a refined edge map generated using the previously-described or some other refinement technique, individually or in combination.

For instance, in one implementation, RE_x indicates a particular pixel in the new refined edge map for the x color component image, where x can be either red, green, or blue, E_x indicates a corresponding pixel in the original edge map for the x color component image (where E_x contains either edge or non-edge valued pixels), P_r indicates the original gray-level intensity value for the corresponding pixel for the red component image, P_g indicates the original gray-level intensity value for the corresponding pixel for the green component image, P_b indicates the original gray-level intensity value for the corresponding pixel for the blue component image, and T_h indicates a preset pixel intensity threshold. In this implementation, RE_x is an edge pixel if E_x is an edge pixel, P_r>T_h, P_g>T_h, and P_b>T_h. Otherwise, RE_x is not an edge pixel.

However, because there may be misregistration, some edges that would be categorized as high intensity edges after correct alignment may not be categorized as high intensity edges before correct alignment. To avoid this or other miscategorizations, the definition of a high intensity edge may be relaxed or expanded to be more inclusive. For instance, in one implementation, edge pixels within a window (of relatively small horizontal and/or vertical extent) relative to a high intensity edge also may be categorized as high intensity edge pixels.

After the application of this process on each color component image, the refinement procedure for assessing horizontal and vertical edge information can be applied to generate a more useful set of high intensity edges. Where there are not a sufficient number of useful high intensity edges within an area, the initial edge maps (that is, the edge map obtained before the high intensity edge refinement process was applied) can be used instead. The edge refinement technique for assessing horizontal and vertical edge information then can be applied to this edge map to obtain a useful set of edges within this area. If there is not a sufficient number of edges in this case, an alternate method of obtaining the horizontal and/or vertical alignment for that area may be used, as discussed below. At the conclusion of edge refinement, a new corresponding image consisting of edge and non-edge valued pixels is created and transferred from the feature selection unit 220 to the alignment vector determination unit 230.

Alignment Vector Determination Unit

The alignment vector determination unit 230 may operate on different types of feature maps. Nonetheless, consistent with the examples set forth previously, operation of the alignment vector determination unit 230 will be described in detail primarily for edges.

After the edges are obtained for each color component image, they are compared between pairs of color component images in order to determine the alignment vector that will lead that pair of images to be aligned, typically in an optimal manner. Other implementations may, for example, accept an alignment vector that satisfies a particular performance threshold. In one implementation, each pair consists of one color component image that serves as a reference image, and a second color component image that serves as a non-reference image.

In the system 200, one color component image is maintained as a reference image that does not undergo any alignment throughout the film sequence, thus ensuring a constant temporal reference throughout the film sequence to be registered. The green reference image typically is chosen as the reference image due to its relatively high contrast and resolution. However, a red, a blue, or some other color component image may be selected as a reference, or the reference may be varied with time. Other implementations may select a reference, if any, as warranted by a particular application.

There are various possible spatial transformations that can be used to align the color component images of a film frame. These include, for example, affine (which includes, for example, translational, rotational, and scaling transformations), polynomial, or any part or combination of these types of transformations. In one implementation, the transformation is represented as one or more translational alignments in the horizontal and/or vertical directions. The transformation in that implementation can be described using I(x, y) to denote a pixel intensity at location (x, y) for a particular color component image, and let I'(x, y) to denote a pixel intensity at location (x, y) after the translational alignment has been imposed on the color component image. With this notation, after the application of a translational alignment vector of (deltax, deltay), I'(x+deltax, y+deltay) equals I(x, y), where deltax represents the horizontal alignment (displacement) and deltay represents the vertical alignment (displacement).

A translational transformation can be performed, for example, either globally for the entire image or locally within different areas of the image. In some instances relating to misalignment problems within film, the misalignment experienced at the outer areas of the image may differ from the misalignment experienced at the center portion of the image. As such, in one implementation, different alignment vectors are applied to different areas of the image. In particular, localized alignment vectors are determined for various areas of the image, as described below. Note that a global alignment generally is a special case of the more generalized procedure that allows for local alignments.

In one implementation, the color component image is divided into areas arranged in a manner such that the center of at least one area and the center of at least one other area are in different proximity to the center of the image.

For simplicity of description, the case where areas are obtained by segmenting the image into uniformly sized areas is considered below, but other segmentations or partitions also may be used. These areas can have overlapping pixels, that is, some pixels can belong to more than one area within the non-reference image. Further, all areas of an image need not necessarily be processed. Hereafter, the different areas of the image will be referred to as blocks. FIG. 3 provides an example of an image 300 that is divided into sixty-four non-overlapping blocks.

In the alignment vector determination unit 230, for each block within the non-reference edge map image, a distortion value (or alternatively, a similarity value) is computed between a defined set of pixels associated with that block and the corresponding set of pixels in the reference image for a given translational alignment vector (deltax, deltay) using a registration metric such as that defined below. A pixel at location (x+deltax, y+deltay) in the reference image is defined to be the corresponding pixel to a pixel at location (x, y) within a block in the non-reference image for a translational alignment vector of (deltax, deltay). The set of pixels used to compute the registration metric value associated with the block can be a subset of the total pixels associated with the block.

One or more of various registration metrics (distortion/similarity measures) can be used. One general class of measures includes feature-based measures that weight comparisons involving feature pixels in a base image (reference or non-reference) differently, for example, more heavily, than comparisons involving non-feature pixels, where a feature pixel is a pixel determined to possess particular characteristics. One implementation uses a one-sided mismatch accumulator as the distortion measure in order to ensure that the maximum potential distortion is constant for each tested (deltax, deltay) vector. In this implementation, the measure accumulates distortion for each pixel that satisfies the condition that there is a pixel in the non-reference image that is identified as part of a feature, whereas the corresponding pixel in the reference image is not identified as part of a feature. (Note that the term "part," as well as any other similar term, is used in this application broadly to refer to either "all" or "less than all." For example, the above pixels may, in general, contain all of the feature or less than all of the feature.) In this case, the maximum potential distortion for each tested vector would be equal to the number of feature (e.g., edge) pixels within the non-reference image.

One specific implementation is now described. Given a set of pixels associated with the non-reference image to be used in the distortion calculation, for each pixel in this set, a determination is made as to whether the non-reference image contains an edge-type pixel when the reference image does not contain an edge-type pixel at the selected corresponding location for each image. If this case occurs, a positive amount of distortion is assigned to this pixel. Otherwise, a distortion of zero is assigned to the pixel. The positive amount typically is constant for all pixels in the set but may not be constant if, for example, certain areas are to be emphasized or de-emphasized. The distortions for all pixels in the set are summed to obtain the total distortion value for a particular alignment vector.

Using the technique noted above, a total distortion value is computed for a number of candidate (deltax, deltay) alignment vectors, within a particular "window," W, of size (2Wx+1)*(2Wy+1), where Wx, Wy are integers greater than or equal to zero, the absolute value of Wx is greater than or equal to deltax, and the absolute value of Wy is greater than or equal to deltay. The (deltax, deltay) vector that provides the lowest distortion value among the set of distortion values associated with the candidate alignment vectors is then selected as the alignment vector, (deltax_selected, deltay_selected).

Given the one-sided mismatch accumulator distortion measure and associated selection process, the alignment vectors in the associated implementation can be determined by determining an initial alignment, defined as (deltax_i, deltay_i), for the image. In one implementation, the center of the image is used to establish the initial alignment vector upon which other blocks of the image base their alignment vector. As an example, the center can comprise the inner 25% of the image, which may overlap, partially or completely, an arbitrary number of blocks. In particular, given this portion in the non-reference image, the (deltax, deltay) pair that is chosen is the pair that provides the lowest distortion using the one-sided mismatch accumulator distortion measure among a number of candidate (deltax, deltay) vectors. If the candidate pairs are located within a window of 2*Wx_in +1 extent in the horizontal direction and 2*Wy_in +1 extent in the vertical direction, then deltax and deltay will satisfy:

−$Wx\_in+deltax\_i<=deltax<=Wx\_in+deltax\_i$, and

−$Wy\_in+deltay\_i<=deltay<=Wy\_in+deltay\_i$.

The alignment vectors for the individual blocks of the image are determined by processing the blocks in a radial manner. Because of the color fringing and larger alignment shifts that can occur toward the outer boundaries of the image in film implementations, the order in which the areas are processed and in which their alignments are determined is based, in one implementation, upon a radial path that begins near the center of the image and then progresses outward. Continuing the example given above, in which the non-reference image is divided into sixty-four non-overlapping blocks, a radial ordering can be attained, for example, if the blocks are grouped into four different rings. A radial ordering refers to processing blocks based on some measure of their distance from a chosen reference point, and, further, processing the blocks in either a generally increasing or a generally decreasing distance from the chosen reference point, such as for example, the center of an image. As discussed below, a radial ordering also may process blocks randomly within a ring, where the rings are processed according to either a generally increasing or generally decreasing distance using some measure of distance. An inner ring is a ring that is positioned a smaller distance, using some measure, from the chosen reference point than a ring under consideration. Similarly, an outer ring is positioned a larger distance from a chosen reference point than a ring under consideration. An innermost ring has no ring that is closer to the chosen reference point.

Figure 4:
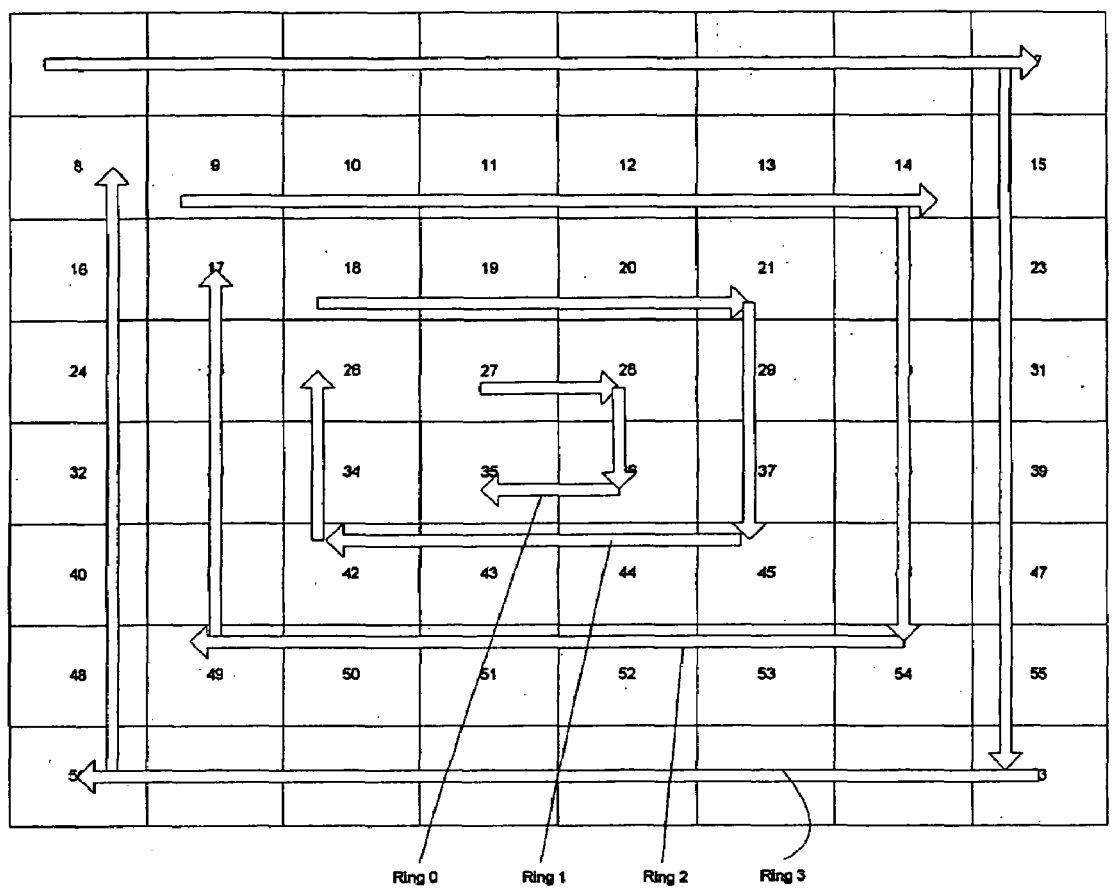
FIG. 4 is a diagram of one implementation of a processing order for the partition of FIG. 3.

FIG. 4 illustrates four different rings. These rings are concentric. The determination of the selected alignment vectors of the blocks proceeds, in this implementation, by first processing the blocks in the first ring (ring 0) consisting of blocks 27, 28, 35, and 36. Next, blocks within the second ring (ring 1) are processed, that is, blocks 18-21, 29, 37, 45-42, 34, and 26. Subsequently, blocks within the third ring (ring 2) are processed, that is, blocks 9-14, 22, 30, 38, 46, 54-49, 41, 33, 25, and 17. Finally, blocks within the fourth ring (ring 3) are processed, that is, blocks 0-7, 15, 23, 31, 39, 47, 55, 63-56, 48, 40, 32, 24, 16, and 8. The manner in which each ring is processed may vary in different implementations. For illustrative purposes, a clockwise encirclement for the different rings is demonstrated, that is, the blocks within a particular ring are processed in a clockwise manner. For each block, a translation alignment vector is determined by establishing an initial translation alignment vector for the block. In one implementation, these initial translation alignment vectors may be determined based on the alignment vectors of their neighboring block(s), where these neighbors belong to the set of blocks that have already been processed and that share a common border or pixel(s) with the block under consideration. However, in other implementations, the blocks may not share a common border or pixel or the initial vector may be set by default or chosen at random.

The initial alignment vector for the block under consideration may be equal to a function of the neighbors of the block under consideration that have already been processed. For example, if a clockwise progression is used, the set of neighbors for block 21 that have already been processed consists of blocks 20 and 28. Similarly, the set of neighbors for block 6 that have already been processed consists of blocks 5, 13, and 14. The function can be defined in a number of ways. For example, the function may be a weighting of the alignment vectors among each of the neighbors or the alignment vector of the neighbor that provides the minimum distortion for the block under consideration.

In implementations that emphasize the radial configuration, the neighbor can be chosen to be the inward radial neighbor of the current block under consideration. An inward radial neighbor is any neighboring block having a distance, using some measure, that is no further from the chosen reference point than is the block under consideration. This implies, for example, that the initial translational alignment vector for blocks 9, 10, and 17 would all be equal to the selected translational alignment vector determined for block 18, and that the initial translational alignment vector for block 11 would be equal to the selected translational alignment vector determined for block 19. This may be computed, for example, by defining "numsideblocks" as an even number representing the number of blocks in the horizontal direction, denoting each block as "index" using an "index number" obtained by labeling the blocks within each image in a raster scan order. For each outer ring m (m=1, 2, 3) and for each block n (n=0, . . . , 8*m+4) within ring m, where n increases in a clockwise direction as illustrated in FIG. 4, the neighbor for a particular block can be defined as follows:

if ($n$ is equal to 0) neighbor=index+numsideblocks+1;

else if ($n<(2*m+1)$) neighbor=index+numsideblocks;

else if ($n$ is equal to $(2*m+1)$) neighbor=index+numsideblocks−1;

else if ($n<(2*m+1)*2$) neighbor=index−1;

else if ($n$ is equal to $(2*m+1)*2$) neighbor=index−numsideblocks−1;

else if ($n<(2*m+1)*3$) neighbor=index−numsideblocks;

else if ($n$ is equal to $(2*m+1)*3$) neighbor=index−numsideblocks+1; and else neighbor=index+1.

For the inner ring, the initial estimate can be computed in a similar manner or any other suitable manner. For example, the blocks within the inner ring can use the translational alignment vector determined for the center portion of the image as their initial estimate. In addition, the center portion of the image can use a preset initial alignment vector, which may be, for example, no initial displacement, or the displacement for the central block or blocks of a previous frame.

Given the initial estimates, deltax_i and deltay_i and the associated distortion for the block under consideration, the distortion associated with a number of candidate alignment vectors that represent different displacements can be calculated. These alignment vectors are taken, for example, from a set of vectors within a window described by the following equations:

$$-Wx(m,n)+\text{delta}x\_i <= \text{delta}x\_\text{selected} <= Wx(m,n) + \text{delta}x\_i, \text{ and}$$

$$-Wy(m,n)+\text{delta}y\_i <= \text{delta}y\_\text{selected} <= Wy(m,n) + \text{delta}y\_i.$$

In these equations, Wx and Wy are integers greater or equal to 0, and the dependence of Wx and Wy on m and n indicates that the horizontal and vertical window areas can be different dimensions for different rings or even different blocks within a ring. The alignment vector that corresponds to the displacement that produces the minimum distortion among the candidate displacements chosen from this set then is selected to be the alignment vector, (deltax_selected, deltay_selected), for the block. Other implementations may use different selection criteria.

Recall that Wx_in and Wy_in represent the window sizes in the x and y directions, respectively, that are used to determine the initial alignment vector for the entire image. If Wx(m)<Wx_in and Wy(m)<Wy_in, for m>=0, computational complexity is reduced because the set of candidate displacements is smaller in size. In one implementation, Wx(m, n) and Wy(m, n) for m, n>=0 are much less than Wx_in and Wy_in, respectively, resulting in a large increase in efficiency. In addition, by setting Wx(m, n) and Wy(m, n) to small values, the opportunity for visible discontinuities between adjacent blocks may be decreased.

There are a number of strategies that may be employed to determine the selected candidate within a particular window of dimension (2*Wx+1)*(2*Wy+1). A straightforward approach is to check every displacement possibility within the window. Another implementation uses a spiral search with a partial distortion measure to determine the selected displacement or alignment vector. In particular, the different displacements are considered in an order that begins at the location associated with the initial alignment vector and proceeds radially outward in a spiral scanning path. Because the one-sided mismatch accumulator is a cumulative distortion, it is possible to periodically compare the current minimum distortion to the distortion accumulated after only a partial number of the pixels within the block (that have been chosen to be used in the distortion calculation) have been processed. If the partial distortion sum is found to be greater than and/or equal to the current minimum distortion, then the candidate location cannot provide the minimum distortion and the other pixels in the block need not be processed.

A spiral search with a partial distortion measure reduces the computational complexity associated with the search of all the candidate locations. In particular, because the initial alignment vector is a function of the neighboring blocks' selected alignment vectors, it is likely that the block under consideration will have lower distortion with this alignment vector or with an alignment vector that corresponds to a displacement that is close in distance to this initial alignment vector rather than an alignment vector that corresponds to a displacement that is farther away in distance from the initial alignment vector. As such, in the calculation of the distortion for a particular candidate displacement, it is likely that the distortion will exceed the current minimum value before a complete check of all of the pixels associated with the block that are chosen to be used in the distortion calculation.

In another implementation, a method that does not search all displacement possibilities within the window can be used in order to reduce the computational complexity of the search. In one implementation, an iterative algorithm can be employed in which the selected alignment vector (corresponding to a particular candidate displacement) is first chosen for one direction (e.g., vertical), and this result is then used as the initial alignment vector in the search for the selected alignment in the orthogonal direction (e.g., horizontal), and this process is then iterated until a particular stopping condition is met. Such an implementation may use different features, for example, vertical and horizontal edges, to determine the alignment vectors for the horizontal and vertical directions, respectively.

For the case where separate horizontal and vertical edge information is retained, the following provides an example of a method that can be used to select one candidate alignment vector from a set of candidate alignment vectors for a given block. First, initial conditions are set (step 1). In particular, the distortion_y associated with the initial alignment vector (deltax_i, deltay_i) is determined using the horizontal edge information, and minimum_y, the minimum distortion in the vertical direction, is set equal to distortion_y, and the selected vertical displacement deltay_selected(0) is set equal to deltay_i. In addition, deltax_selected (0) is set equal to deltax_i.

Then, for i=1, until the appropriate stopping condition is met, the selected vertical shift is determined using the horizontal edge information (step 2-1). This may be done by calculating the distortion_y associated with each of the candidate displacement possibilities (deltax_selected(i−1), deltay+deltay_selected(i−1)) taken from the set−Wy<=deltay<=Wy, using the one-sided mismatch accumulator distortion measure (step 2-1-1). For the first iteration, it is not necessary to calculate the distortion value, distortion_y, for deltay=0 because it has already been calculated. For all other iterations, it is necessary to calculate the distortion value associated with deltay=0.

The minimum distortion_y among the set of calculated distortion values then is found, and deltay_selected is set to be the sum of the deltay that produces this minimum distortion value and deltay_selected(i−1), and this distortion value is set to be the new minimum distortion value, minimum_y (step 2-1-2). A determination then is made as to whether the stopping condition for a particular direction has been met (step 2-1-3). If so, step (2-1) will not be repeated after step (2-2).

Next, the selected horizontal shift is determined using the vertical edge information (step 2-2). This is done by calculating distortion_x associated with each of the candidate displacement possibilities (deltax+deltax_selected(i−1), deltay_selected(i−1)) taken from the set−Wx<=deltax<=Wx, using the one-sided mismatch accumulator distortion measure (step 2-2-1).

The minimum distortion_x among the set of calculated distortion values then is found, deltax_selected is set to be the sum of the deltax that produces this minimum distortion value and deltax_selected(i−1), and this distortion value is set to be the new minimum distortion value, minimum_x (step 2-2-2). A determination then is made as to whether the stopping condition for a particular direction has been met. If so, step (2-2) will not be repeated after step (2-1).

Each stopping condition can be, for example, based on a preset number of iterations or on the condition that the selected alignment vector for a block for iteration i is the same as that for the preceding iteration, for example, when deltax_selected(i−1)=deltax_selected(i) and deltay_selected (i−1)=deltay_selected(i), among others.

If there is not a similar implementation that reduces the number of candidate locations searched can be performed using edge information that is captured for both vertical and horizontal directions simultaneously (for example, the edge information is based on the magnitude of the edge strength). In such a case, the distortion value computation at (deltax_selected(i−1), deltay_selected(i−1)) for iteration i need not be calculated because it already has been calculated in iteration i−1, and the single edge-map information is used instead of the horizontal and vertical edge maps discussed above. If there is not a sufficient number of useful edges in a particular direction within a block to be registered within the non-reference image or within a corresponding block in the reference image, an alternative method may be performed to select an alignment vector for this block. For example, the alignment for that direction can simply be taken to be the initial alignment for that direction. Alternatively, a larger area encompassing more blocks (or even the entire image) can be used to determine the selected alignment vector for this block. Other alternative or additional methods can also be used to select an alignment vector for this block. In one implementation, if the center portion of the image does not have enough useful edges, the alignment vector for the center is set to the selected alignment vector determined from the entire image.

Alignment Vector Application Unit

After the alignment vector determination unit 230 determines the alignment vector for each block within the color component image, the alignment vector application unit 240 aligns each block using these vectors or a modification of them. If, for example, only one block exists within the image and only one global alignment vector is computed, then the alignment is straightforward. If, however, the image has been segregated into multiple blocks, the image can be spatially aligned by a number of different methods.

One technique that can be used for alignment involves applying a uniform alignment to each block by its corresponding alignment vector. However, different blocks within that color component image may have different alignment vectors. In such a case, discontinuities may exist at a boundary between blocks.

The alignment vector application unit 240 attempts to reduce the perceptual effects of discontinuities by "feathering" at the boundaries between blocks with different alignment vectors, as described below. In the implementation of system 200, this technique is applied only to the non-reference images because the reference image does not undergo any alignments (recall that the non-reference images are shifted with respect to the reference image).

Although the feathering process will be described hereinafter with reference to horizontal and vertical alignment values to maintain consistency with early examples, the feathering process also is applicable to other types of transformations. Feathering is performed, in this implementation, along the y-axis boundaries between two horizontally neighboring blocks, along the x-axis boundaries between two vertically neighboring blocks, and for the four-corner boundaries between four neighboring blocks.

Figure 5:
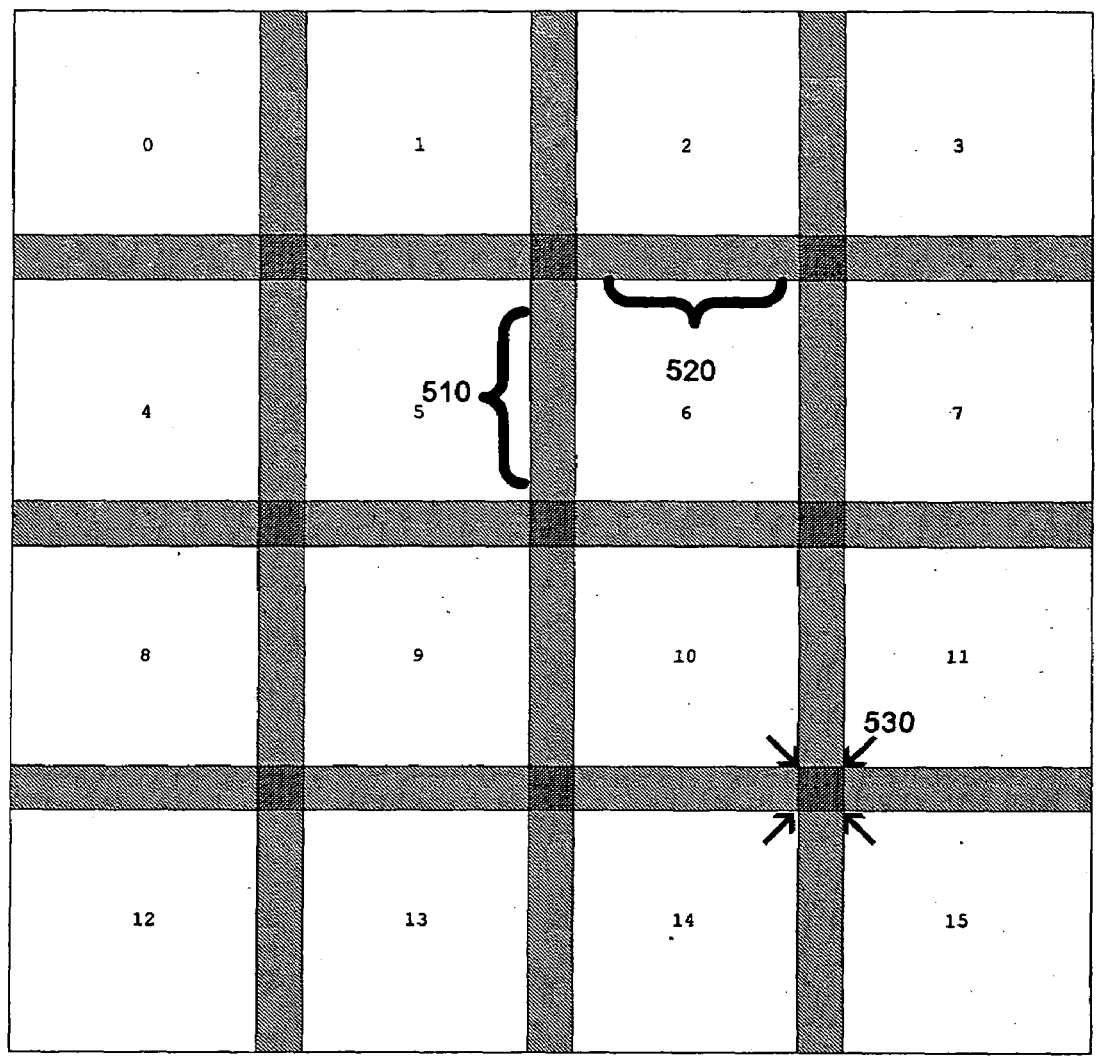
FIG. 5 is a diagram highlighting areas in which one implementation applies feathering.

For instance, FIG. 5 provides an example 500 identifying several pixels that are affected by the feathering scheme described above when the image is divided into sixteen uniformly sized areas. For each y axis boundary, feathering is performed across a particular-sized horizontal window. For example, for the y-axis boundary between blocks 5 and 6, the window 510 may be used. For each x-axis boundary, feathering is performed across a particular-sized vertical window. For example, for the x-axis boundary between blocks 2 and 6, the window 520 may be used. For each of the four-corner boundaries, feathering is performed across a particular-sized vertical and a particular-sized horizontal window. For example, for the four-corner boundary between blocks 10, 11, 14, and 15, the window 530 (arrows point to corners of window 530 in FIG. 5) may be used. The sizes of these "feather windows" typically impact the rate at which the alignment values for the pixels at the boundaries blend from one value to another. In one implementation, the window size is determined as a function of the maximum (max) of the difference between the x alignment values of the neighboring blocks and the difference between the y alignment values of the neighboring blocks. However, many techniques may be used to determine the size and/or shape of the various windows. These windows need not be rectangular or continuous.

In one implementation, within the feather window, new alignment values are obtained by linearly interpolating the different alignment values of the neighboring blocks under consideration. Another implementation uses non-linear interpolation. In either case, the interpolated alignment values then are used to obtain the new intensity value of the pixel at a particular location. In particular, the pixel at the location corresponding to the selected alignment value is used as the value for the current location. If the selected alignment value in a particular direction is not an integer, then the intensity values of the pixels that correspond to the two integer-valued displacements closest in distance to the selected displacement are appropriately weighted and combined to obtain the final new intensity value.

Note that the calculation of the new alignment vectors within the feathering window may be performed in the alignment vector determination unit 230 rather than the alignment vector application unit 240. The calculation of the new intensity values within the feathering window would still be performed in the alignment vector application unit 240. Other implementations may perform many of the various described operations in different orders or in different functional blocks.

As an example of the feathering scheme, assume (dx1, dy1) is the alignment vector for block 5, and (dx2, dy2) is the alignment vector for block 6. In this example, feathering across the y-axis boundary that is shared between these two blocks is addressed, and for simplicity, the corner conditions are not addressed. Then the size of the feather window can be "fwsize"=constant*max(abs(dx1−dx2), abs(dy1−dy2)), where abs( ) indicates the absolute value function. Assume the boundary location is at (x3, y3) and the height of the block is "blockh." Then, the alignment values will be interpolated from the x3−(fwsize/2) position to the x3+(fwsize/2) position in the x direction for each of the rows from the vertical start of the block to the vertical start of the block+blockh. For example, assume that max(abs(dx1−dx2), abs(dy1−dy2))=abs(dx1−dx2). Then, the horizontal alignment value for the point (x4, y4) is computed as (dx1+(x4−(x3−(fwsize/2)))*(dx2−dx1)/(fwsize)) and the vertical alignment value for the point (x4, y4) is computed as (dy1+(x4−(x3−(fwsize/2)))*(dy2−dy1)/(fwsize)). The new value at a particular location is the value of the pixel at the calculated displacement location (or the weighted combination of the intensities at the nearest integer grid points). Note that special care may need to be applied to the boundaries of the image when the feathering approach is used.

Another implementation adjusts for discontinuities by using warping. Although the warping process will be described hereinafter with reference to horizontal and vertical alignment values to maintain consistency with early examples, the warping process also is applicable to other types of transformations. In one example of a warping technique, each block can be identified with a control point at its center. The horizontal and vertical alignment values that were obtained for each block can become the alignment values for the block's control point. The alignment values for the remaining pixels within the image may be obtained by interpolating the alignment values of the nearest control points. These alignment values are then applied to the pixels within the non-reference image.

Composite Phase Unit

Figure 6:
FIG. 6 is a picture illustrating a result of applying one implementation of a registration technique to the picture in FIG. 1.

Once the non-reference images are aligned by the alignment vector application unit 240, the images can be recombined into a composite color frame by the composite phase unit 250. FIG. 6 illustrates a composite frame after the composite phase unit 250 has been applied to three color component images. In one implementation, a laser film printer is optionally used to avoid the loss of resolution incurred with an optical printer.

Additional Implementations

The implementations and techniques described above can be applied to a variety of applications in which multiple separations need to be registered. Examples include spectral and non-spectral separations. Spectral separations are used, for example, in: (1) color film applications capturing, for example, different color frequencies, (2) astronomical applications capturing, for example, radio frequencies and/or optical frequencies, and (3) medical applications capturing, for example, different magnetic (MRI), X-ray, and sound (ultrasound) frequencies. As the last example illustrates, spectral separations may be captured from various frequency sources, including, for example, electromagnetic and sound waves. Non-spectral separations may be obtained from, for example, variations in pressure, temperature, energy, or power.

A number of implementations have been described. Nevertheless, it will be understood that various modifications may be made without departing from the spirit and scope of the claims. For example, the implementations and features described may be implemented in a process, a device, a combination of devices employing a process, or in a computer readable medium or storage device (for example, a floppy disk, a hard disk, RAM, ROM, firmware, electromagnetic waves encoding or transmitting instructions, or some combination) embodying instructions for such a process.

One such device is, for example, a computer including a programmable device (for example, a processor, programmable logic device, application specific integrated circuit, controller chip, ROM, or RAM) with appropriate programmed instructions and, if needed, a storage device (for example, an external or internal hard disk, a floppy disk, a CD, a DVD, a cassette, a tape, ROM, or RAM). The computer may include, for example, one or more general-purpose computers (for example, personal computers), one or more special-purpose computers (for example, devices specifically programmed to communicate with each other), or some combination.

Accordingly, other implementations are within the scope of the following claims.

What is claimed is:

1. A method of performing registration of digitized images, the method comprising:
   dividing a selected component image into a set of areas;
   grouping the areas into multiple rings; and
   determining transformations for at least two areas in the set of areas in an order that begins with at least one area within an innermost ring and proceeds to at least one area within a ring other than the innermost ring,
   wherein determining transformations comprises automatically determining an alignment vector for a particular area of the set of areas based on a previously determined alignment vector corresponding to at least one area that belongs to either an inner ring or to a same ring as the particular area.

2. The method of claim 1 wherein the set of areas are arranged such that a center of at least one area of the set of areas and a center of at least one other area of the set of areas are in different proximity to a center of the selected component image.

3. The method of claim 1 wherein determining an alignment vector for a particular area of the set of areas based on a previously determined alignment vector corresponding to at least one area that belongs to either an inner ring or to a same ring as the particular area comprises:
   determining an initial alignment vector for the particular area of the set of areas based on a previously determined alignment vector corresponding to at least one neighboring area, where the neighboring area is defined as an area that shares a common border or at least one pixel with the particular area and the neighboring area belongs to either an inner ring or to a same ring as the particular area; and
   determining the alignment vector for the particular area based on the initial alignment vector for the particular area.

4. The method of claim 3 wherein the initial alignment vector is based on a previously determined alignment vector that provides a minimum distortion measure for the particular area among previously determined alignment vectors for at least two neighboring areas.

5. The method of claim 3 wherein the initial alignment vector is based on a previously determined alignment vector for an inward radial neighboring area.

6. A computer program for performing registration of digitized images, the computer program residing on a computer-readable medium and comprising instructions for causing a computer to perform operations including:
   dividing a selected component image into a set of areas;
   grouping the areas into multiple rings; and
   determining transformations for at least two areas in the set of areas in an order that begins with at least one area within an innermost ring and proceeds to at least one area within a ring other than the innermost ring,
   wherein determining transformations comprises automatically determining an alignment vector for a particular area of the set of areas based on a previously determined alignment vector corresponding to at least one area that belongs to either an inner ring or to a same ring as the particular area.

7. An apparatus for performing registration of digitized images, the apparatus comprising one or more processors programmed to perform at least the following operations:
   dividing a selected component image into a set of areas;
   grouping the areas into multiple rings; and
   determining transformations for at least two areas in the set of areas in an order that begins with at least one area within an innermost ring and proceeds to at least one area within a ring other than the innermost ring,
wherein determining transformations comprises automatically determining an alignment vector for a particular area of the set of areas based on a previously determined alignment vector corresponding to at least one area that belongs to either an inner ring or to a same ring as the particular area.

8. A method of performing registration of digitized images, the method comprising:
   dividing a selected component image into a set of areas; and
   determining a transformation for a particular area in the set of areas based on at least one previously determined transformation for at least one other area, where a center of the other area is not farther in proximity to a center of the selected component image than a center of the particular area,
   wherein determining the transformation includes:
      automatically computing distortion values associated with the other area and the particular area, and
      automatically determining the transformation for the particular area based on the computed distortion values.

9. The method of claim 8 further comprising:
   grouping the set of areas into multiple rings that form at least one inner ring and at least one outer ring; and
   determining transformations for at least two areas of the set of areas in an order that begins with at least one area within the inner ring and proceeds to at least one area within the outer ring.

10. The method of claim 9 wherein determining transformations comprises:
    determining an initial alignment vector for a particular area of the set of areas based on a previously determined alignment vector corresponding to at least one neighboring area, where the neighboring area is defined as an area that shares a common border or at least one pixel with the particular area; and determining an alignment vector for the particular area based on the initial alignment vector for the particular area.

11. A computer program for performing registration of digitized images, the computer program residing on a computer-readable medium and comprising instructions for causing a computer to perform operations including:

dividing a selected component image into a set of areas; and determining a transformation for a particular area in the set of areas based on at least one previously determined transformation for at least one other area, where a center of the other area is not farther in proximity to a center of the selected component image than a center of the particular area, wherein determining the transformation includes:

automatically computing distortion values associated with the other area and the particular area, and automatically determining the transformation for the particular area based on the computed distortion values.

12. An apparatus for performing registration of digitized images, the apparatus comprising one or more processors programmed to perform at least the following operations:

dividing a selected component image into a set of areas, and determining a transformation for a particular area in the set of areas based on at least one previously determined transformation for at least one other area, where a center of the other area is not farther in proximity to a center of the selected component image than a center of the particular area, wherein determining the transformation includes:

automatically computing distortion values associated with the other area and the particular area, and automatically determining the transformation for the particular area based on the computed distortion values.

* * * * *

UNITED STATES PATENT AND TRADEMARK OFFICE
CERTIFICATE OF CORRECTION

PATENT NO.        : 7,272,268 B2                                        Page 1 of 1
APPLICATION NO.   : 11/282675
DATED             : September 18, 2007
INVENTOR(S)       : Keren O. Perlmutter et al.

It is certified that error appears in the above-identified patent and that said Letters Patent is hereby corrected as shown below:

On The Title Page, Item (60) please insert the following section:

Related U.S. Application Data

(60)   Division of application No. 10/035,337, filed on Jan 4, 2002, now Pat. No. 7,092,584.

Signed and Sealed this

Twenty Second Day of April, 2008

JON W. DUDAS
*Director of the United States Patent and Trademark Office*